United States Patent [19]
Stearns

[11] Patent Number: 5,190,670
[45] Date of Patent: Mar. 2, 1993

[54] PROCESS AND SYSTEM FOR SEPARATING AND CONDENSING CONTAMINANTS FROM A LIQUID

[75] Inventor: Donald M. Stearns, Cocoa, Fla.

[73] Assignee: PEC Research, Inc., Titusville, Fla.

[21] Appl. No.: 882,968

[22] Filed: May 14, 1992

Related U.S. Application Data

[63] Continuation-in-part of Ser. No. 494,457, Mar. 16, 1990, Pat. No. 5,125,167, and a continuation-in-part of Ser. No. 588,268, Sep. 26, 1990, Pat. No. 5,133,882, and a continuation-in-part of Ser. No. 700,610, May 15, 1991.

[51] Int. Cl.$^5$ ............................................. B01D 37/00
[52] U.S. Cl. .................................. 210/767; 210/221.1; 210/221.2; 210/180; 210/703; 55/55; 55/56; 55/189; 62/119
[58] Field of Search ............... 210/767, 195.1, 221.2, 210/776, 221.1, 180, 703; 55/55, 56, 189, 418; 62/48.2, 82, 119, 183

[56] References Cited

U.S. PATENT DOCUMENTS

| | | | |
|---|---|---|---|
| 4,365,480 | 12/1982 | Darm | 62/82 |
| 4,889,638 | 12/1989 | Rockford et al. | 210/703 |
| 5,039,425 | 8/1991 | Caris et al. | 210/DIG. 5 |
| 5,125,167 | 6/1992 | Stearns | 62/48.2 |
| 5,133,882 | 7/1992 | Stearns | 210/776 |

Primary Examiner—Robert A. Dawson
Assistant Examiner—Ana M. Fortuna
Attorney, Agent, or Firm—Antonelli, Terry, Stout & Kraus

[57] ABSTRACT

A closed loop, recycle, condensing dual velocity, air stripper for the removal of organic contaminates from surface water and sub-surface water that provides a system completely different from current designs in that it does not transfer the problem from the water to the air, but removes the problem of organic contamination from the water without any open air discharge and therefore meets the standards of the 1990 Clean Air Act.

4 Claims, 5 Drawing Sheets

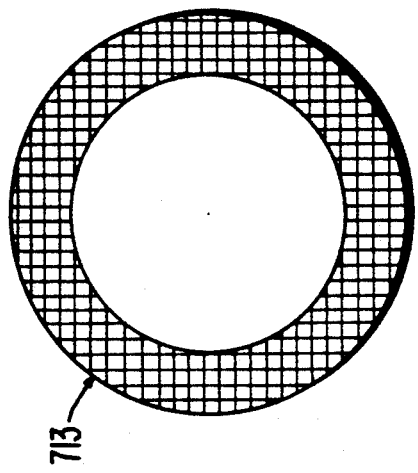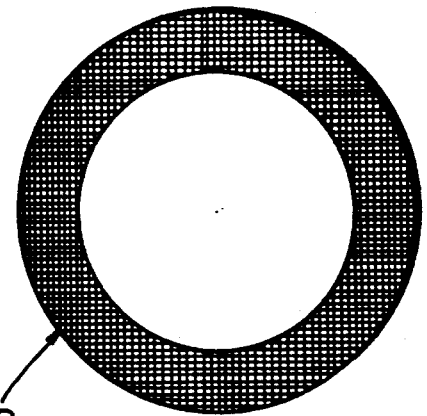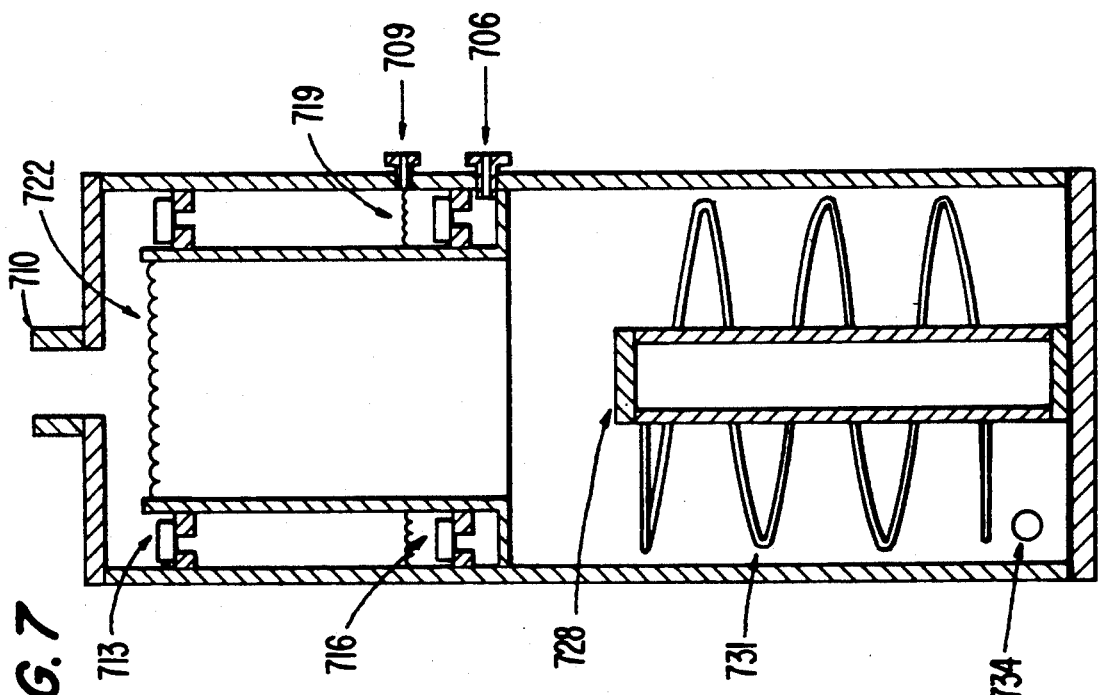

PROCESS AND SYSTEM FOR SEPARATING AND CONDENSING CONTAMINANTS FROM A LIQUID

RELATED APPLICATIONS

This patent application is a continuation-in-part of application Ser. No. 07/494,457, filed Mar. 16, 1990, now U.S. Pat. No. 5,125,167, application Ser. No. 07/588,268, filed Sep. 26, 1990, now U.S. Pat. No. 5,133,882 and application Ser. No. 07/700,610, filed May 15, 1991. The content of each of these applications is incorporated herein by reference.

TECHNICAL FIELD

This invention relates to air strippers used in the field of removing organic contaminates from water.

BACKGROUND ART

The use of air strippers has become a standard method of removal of organic contamination from surface and sub-surface water for the purpose of post-treatment of potable water supplies, quality treatment of potable water for removal of organic materials produced by the use of chlorine, and for the removal of spilled or dumped toxic organic chemicals resulting in contamination of both surface and sub-surface water supplies.

The air strippers in use today do not solve any of the contamination problems, from the standpoint of destroying the toxic organic materials, but simply transfer the problem from the water into the air, thus producing acceptable potable raw water supplies at the expense of air pollution. The open discharge of toxic organic materials is prohibited by the Clean Air Act and only a closed loop air stripping recirculated air system can meet the requirements of this Federal Law.

DISCLOSURE OF INVENTION

The invention is based on the use of a chilled closed recirculated gas as disclosed in U.S. patent application Ser. No. 07/494,457 filed on Mar. 16, 1990 coupled with a diffuser and mass transfer device disclosed in U.S. patent applications Ser. No. 07/588,268, filed Sep. 26, 1990, and Ser. No. 07/700,610, filed May 15, 1991, and in my copending application entitled "Method and Apparatus For Dissolving Gas In Liquid, e.g., In Wastewater Collection And Transmission Systems" filed on even date herewith and a dual velocity dissolved and entrained air stripper column disclosed in U.S. patent application Ser. No. 07/700,610 of May 15, 1991.

According to the present invention, the contaminated water is delivered under pressure to the inlet of a diffuser/mass transfer device, in which air is also provided under pressure by a compressor. The pressure within the diffuser/mass transfer device causes an increase in the solubility of air in the water and the dissolved air contacts the dissolved organic material also in the water in the form of contamination. The elements of the diffuser cause the air introduced by the compressor to become entrained in small size air bubbles which can also act to provide surface contact with the organic material that is forced out of solution by the super-saturation of the air in the water.

After passing through the diffuser/mass transfer device, the water with dissolved and entrained air is introduced into the bottom of the low velocity section of a dual velocity air stripper which is under a positive pressure near that of the discharge of the diffuser/mass transfer device, caused by the height of the water column within the dual velocity air stripper. As the dissolved air reacts to the effect of pressure, release of the dissolved air starts at the bottom of the air stripper column and continues in relation to the height of water in the air stripper column from the bottom to the top of the water retained by the overflow weir of the air stripper column. To reduce the effect of constant pressure reduction in the column, which results in additional release of dissolved air, a spiral flow baffle system is used to minimize the direct escape of the micro-bubbles produced by the air being released from solution in order to produce a maximum period of contact between the bubbles of organic material and the air bubbles.

After overflowing the weir of the low velocity section of the dual velocity air stripper, the water is exposed to a final stripping operation by the introduction of pressurized air below the surface of a few inches of water, thus producing a high velocity stripping action of any remaining organic material that has been released from the bonds of solubility by the water. The purified water is then discharged by gravity for return to a surface or sub-surface supply. With the use of a potable water recycle system as disclosed in U.S. patent application Ser. No. 07/700,610 dated May 15, 1991, the discharge of the air stripper could be used as a raw water supply.

The vapor entrained in the air used for stripping of the organic material, as well as water in the form of saturated vapor based on the temperature of the air, is introduced into the inlet of vertical condenser and centrifugal fan such as that disclosed in U.S. patent application Ser. No. 07/494,457 filed Mar. 16, 1990, in which the organic vapor and some water vapor are condensed. The condensing of the water vapor is based on the temperature maintained in the chilled water gas/liquid condenser and is limited to the amount of water vapor above the dew-point. As only a small amount of air is utilized by the dual velocity air stripper, the amount of condensed water vapor is limited and as the organic materials condense at a higher rate than water, due to the difference in entropy values, thus providing a high concentration of organic material in the condensate. Accurate control of both the temperature of the surface of the condenser and the air flow rate will minimize the condensation of water vapor. The temperature control of the surface of the condenser is obtained by control of the temperature and flow rate of the chilled water supply to the condenser. The condensate is discharged by gravity.

A centrifugal fan is located directly above the vertical gas/liquid condenser to provide for the pressure loss in the condenser and ducting which will insure, under normal operating conditions, that a vacuum condition does not develop at the suction inlet of the compressor. In order to protect the compressor from the possible destructive effects of a vacuum condition at the suction, a vacuum relief valve is included in the system.

The recirculated air discharged from the centrifugal fan of the recycle condenser is introduced into the suction of the compressor. The discharge of the compressor is directed to two different requirements, the diffuser/mass transfer device and the final high velocity zone of the dual velocity air stripper.

BRIEF DESCRIPTION OF DRAWINGS

FIG. 7 is a sectional drawing of the (2) spiral flow dual velocity organic reduction air stripper column.

FIG. 8 is a top plan view of the (713) water distributor for introduction of the water into the high velocity stripping section of the (2) air stripper column.

FIG. 9 is a top plan view of the (716) air distributor for the introduction of air into the high velocity stripping section of the (2) air stripper column.

BEST MODE FOR CARRYING OUT THE INVENTION

Figure 1:
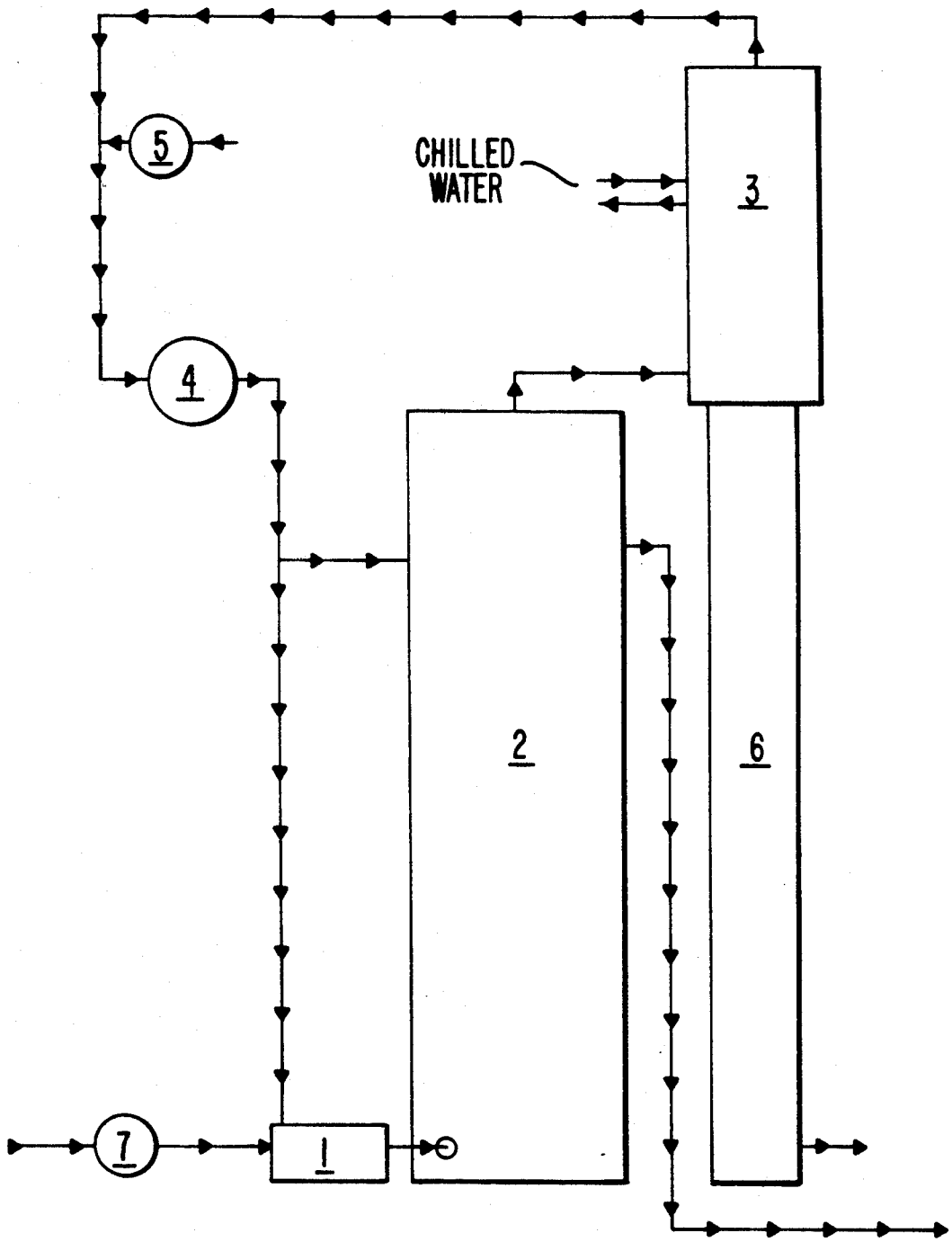
FIG. 1 is a flow diagram.

With reference to FIG. 1, the flow diagram, the system includes (1) the diffuser/mass transfer device, (2) the dual velocity air stripper column, (3) the vertical condenser and centrifugal fan, (4) closed loop compressor, (5) vacuum relief valve, (6) vertical open top storage tank and (7) pumps for pressurized supply of water for purification.

Contaminated water is received at the suction of contaminated water pressure supply pumps (7) and introduced into the diffuser/mass transfer device (1). Compressed air from the discharge of the recycle rotary compressor (4) is also introduced into the inlet of the (1) pressurized diffuser/mass transfer device. Due to the internal pressure of the diffuser/mass transfer device, the amount of air that can be forced into the water is more than double the amount that can be dissolved without use of pressure.

The super-saturated water containing the toxic organic material is introduced into the bottom of the dual velocity air stripper column (2). As the water moves from the bottom of the column to the top of the column, the pressure is reduced and the air forced into solution by pressure, is released in the form of microbubbles and pulls the organic material out of the water. By the use of a baffled spiral flow, which reduces the velocity of the air travel, attachment of the organic matter to the air bubble is greatly increased as compared to direct raise air strippers used today.

The second stage of the dual velocity air stripper (2) provides the free fall cascade of the water from the slow rise spiral flow section through a high velocity air stream. This section of the dual velocity air stripper (2) provides high velocity impact of the rising high velocity compressed air with the downward traveling water, thus providing a final impact type of air stripping.

The recirculated air from the dual velocity air stripper (20 is drawn into the vertical gas/liquid condenser (3) by a centrifugal fan. The organic vapor is condensed in the vertical gas/liquid condenser by chilled water circulating in the interior surfaces of the condenser. Storage of the condensed organic and water is provided in the vertical storage tank (6).

Chilled water is supplied to the vertical gas/liquid condenser (3) by a chilled water supply system, details of which are not shown. The centrifugal fan provides a positive pressure feed into the suction of the rotary compressor (4). The discharge of the rotary compressor (4) provides the required feed to both the pressurized diffuser/mass transfer device (1) and the high velocity section of the dual velocity air stripper column (2). This design allows a closed loop recirculation of the chilled air, which in turn prevents air pollution and the destruction of the ozone layer.

FIG. (2) provides a sectional assembly drawing of the (1) diffuser/mass transfer device which is intended to operate at a minimum pressure of 15 PSIG, but more normally at a pressure of 30 PSIG. The (2) diffuser/mass transfer device provides a range of finely entrained air bubbles but more importantly, increases the amount of dissolved air which will be released as the pressure is reduced in the (2) dual velocity air stripper column. The components of the (1) diffuser/mass transfer device includes the (201) inlet spool body, the (203) diffuser body, the (205) gas inlet ring, the (207) injection spacer inlet sleeve, the (209) diffuser reversible baffle, the (211) "O" ring, the (213) discharge spool piece, the (215) discharge directional ring, the (217) flow control valves, the (219) anti-rotation locking bar and the (221) opening in the diffuser/mass transfer body for the passage of compressed air into the (205) gas inlet ring.

Figure 3:
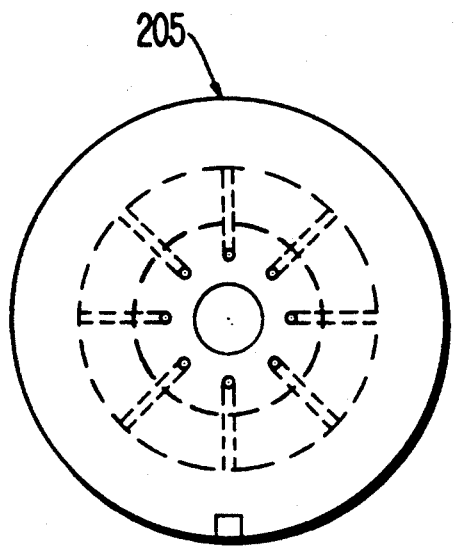
FIG. 3 is a top plan view of the (205) gas inlet ring.

FIG. 3 is a top plan view of the (205) gas inlet ring that shows the method of introduction of the air into the high velocity water flow which provides opposed injection of the air into the water and the 90 degree angle. The opposed flow of the air and the 90 degree angle of injection provides the initial dispersion of the air in the water. The (205) gas inlet ring has a slot for positioning and anti-rotation using the (219) anti-rotation locking bar.

Figure 4:
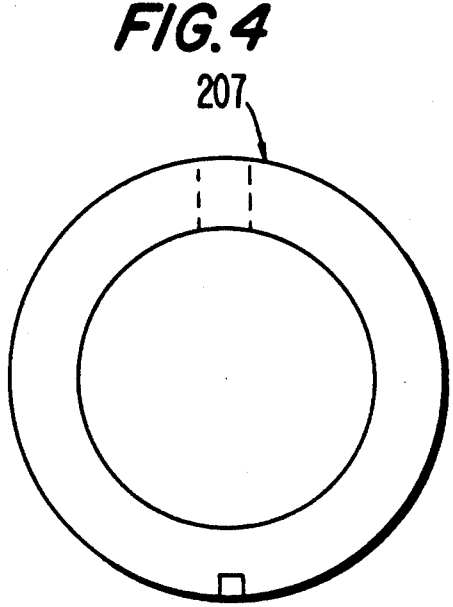
FIG. 4 is a top plan view of the (207) injection spacer inlet sleeve.

FIG. 4 is a top plan view of the (207) inlet spacer used between the (205) gas inlet ring and the (209) diffuser/mass transfer reversible baffle, and also between each (209) reversible baffle.

Figure 5:
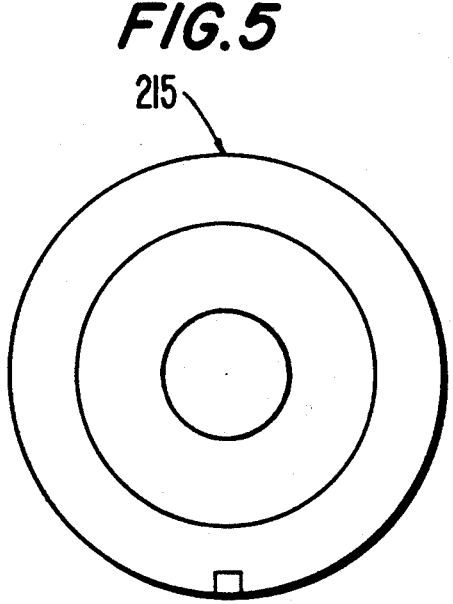
FIG. 5 is a top plan view of the (215) discharge directional ring.

FIG. 5 is a plan top view of the (215) discharge directional ring which rotates the water and dissolved and entrained air to cause a circular motion in addition to the normal linear movement.

Figure 6:
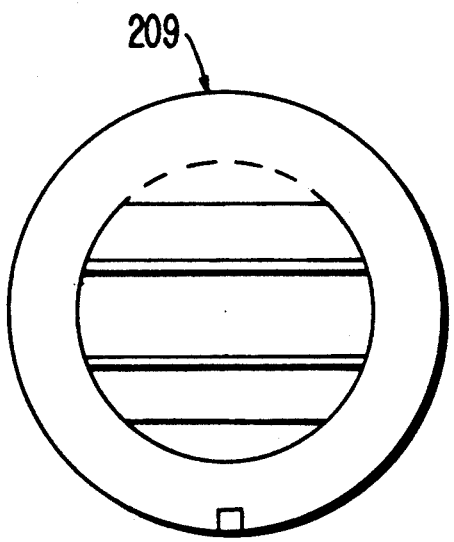
FIG. 6 is a top plan view of the (209) diffuser reversible baffle.

FIG. 6 is a plan top view of the (209) diffuser reversible baffle showing the deflected flow and knife edge which causes turbulence for entrainment of the air in the water flowing at high velocity.

Figure 2:
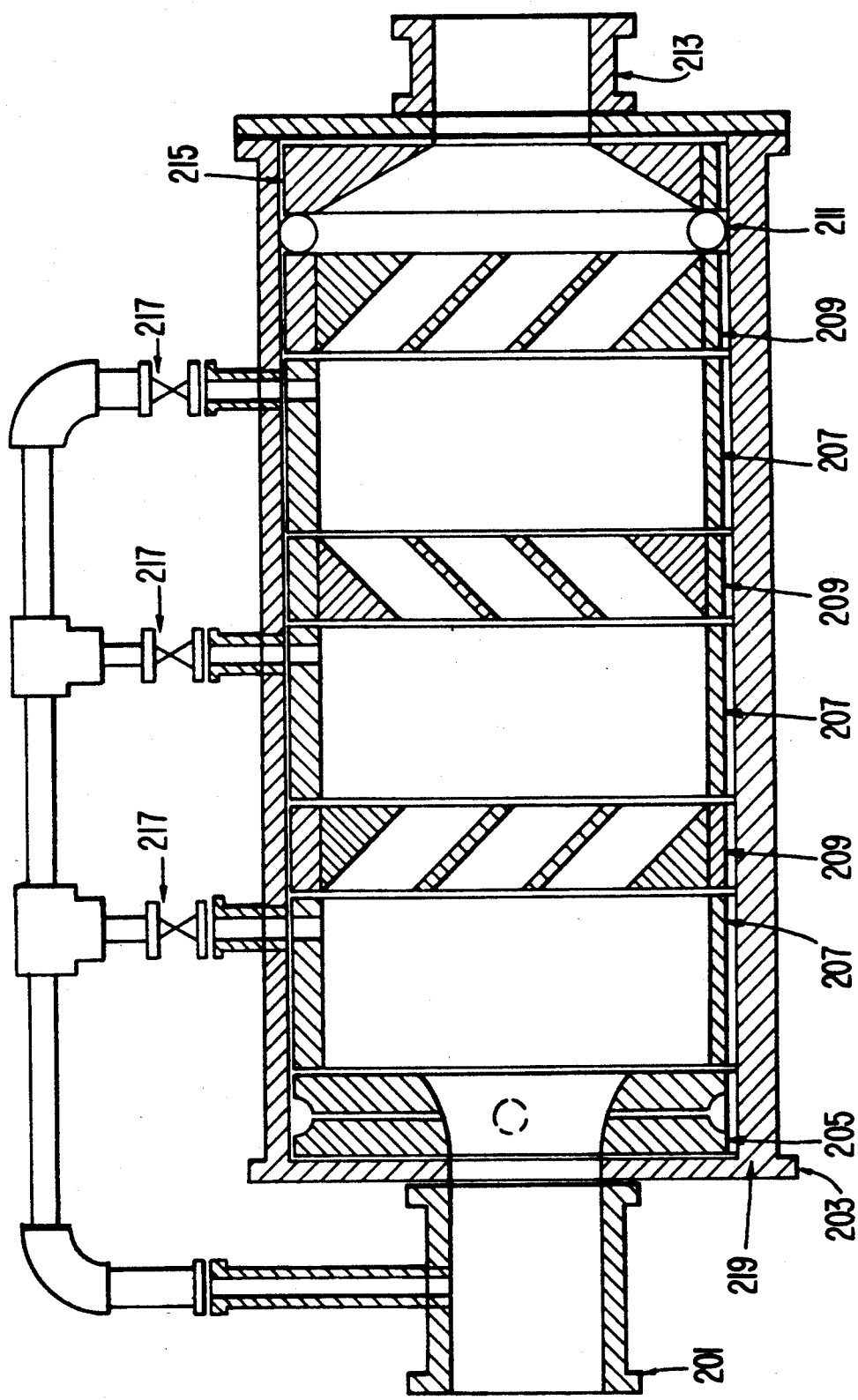
FIG. 2 is a sectional assembly drawing of the (2) diffuser/mass transfer device.

It will be appreciated that this (209) baffle can simply be rotated to face the opposite direction to change the direction of deflection. For example, as shown in FIG. 2, the second of the series of three (209) baffles faces a direction opposite that of the first and third. This allows the direction of deflection to be changed as the wastewater flows downstream while still requiring a baffle of only one construction.

FIG. 7 shows the spiral flow dual velocity organic air stripper column which is divided into two zones, each of which has a different function. In the bottom zone, the water with dissolved and entrained air is introduced into the column in a manner that produces a spiral flow. A helix spiral baffle provides a means of reducing the travel rate of the entrained air and the dissolved air that comes out of the water as the pressure is reduced. This provides the contact time with the organic contaminates in the water to allow attachment of the air to the entrained organic matter and thus a high degree of removal of the organic matter in the low velocity zone of the organic reduction spiral flow dual velocity air stripper column. After the water rises to the top of the low velocity zone, of the column, it flows over a "V" notch weir and on to the (713) water distributor. Compressed air is introduced under the (716) air distributor by the proper placement of the outlet nozzle. This provides a uniform back pressure coupled with the design of the air distributor, provides uniform flow of the air around the diameter of the column. The high velocity zone of the stripper column where fast air bubbles impact the droplets of water in order to remove microbubble sizes of both air and organic matter that are still entrained in the water received from the low velocity zone of the spiral flow dual velocity air stripper column. Number (734) indicates the placement of the inlet of the stripper column's low velocity zone. Number (719) indicates the water level maintained in the stripper column high velocity zone. Number (709) indicates the positioning of the discharge nozzle. Number (706) indicates the positioning of the compressed air inlet to the high velocity zone of the stripper column.

FIG. 8 is a top plan view of (713) the water distributor screen that provides minimum size water droplets for free-fall contact with the high velocity air bubbles.

FIG. 9 is a top plan view of (716) the compressed air distributor screen which is placed under a fixed level of back pressure by the water retained between the (716) air distributor screen and the discharge nozzle (709).

Figure 10B:
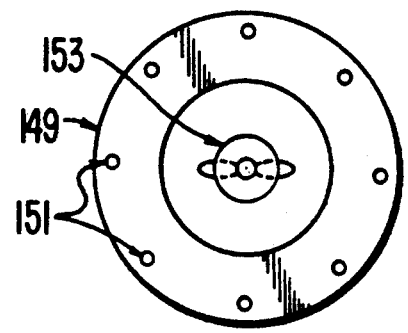
FIG. 10A is an external view of the housing and FIGS. 10B, 10C and 10D are sectional views of the interior components of the (3) vertical condenser and centrifugal fan.
Figure 10A:
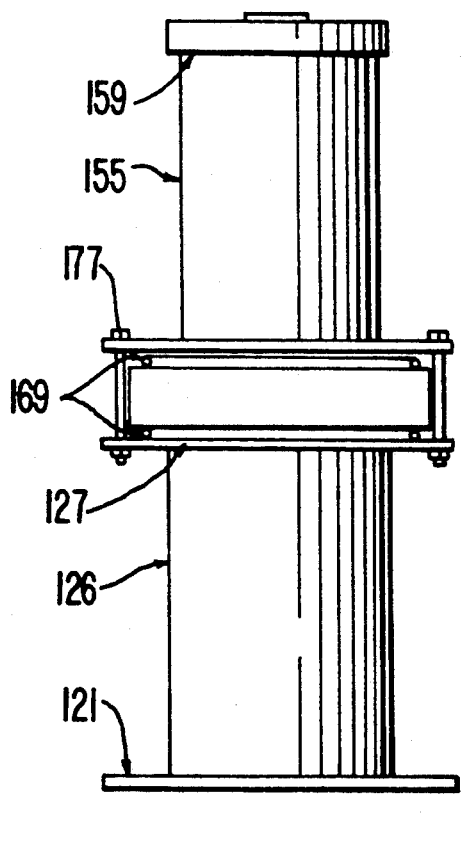
Figure 10C:
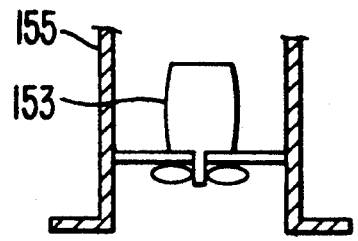
Figure 10D:
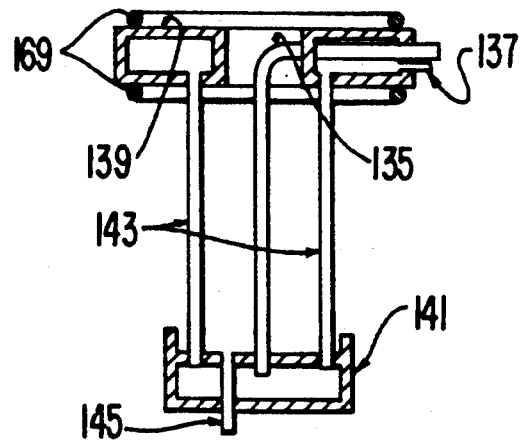

FIG. 10B is a top plan view of the housing cover, FIG. 10A is an elevation drawing of the housing and FIGS. 10C and 10D are sectional views of the condenser and centrifugal fan. The two section housing is defined by numbers (155), (126) and (121). The housing cover and attachment bolts are shown as (159) and (149). The centrifugal fan is shown as (153). The condenser includes the (1410 chilled water collector, the chilled (139) water distributor header, the (145) condensed vapor return tubing, the (143) vertical heat exchanger tubes, the (135) chilled water return pipe, the (137) chilled water inlet pipe, and the (169) O-ring seal gaskets.

I claim:

1. A method for removing contaminates from a liquid comprising the following series of steps:
    providing a source of pressurized gas;
    dissolving and entraining a gas in said liquid under pressure such that said liquid becomes super-saturated with said gas;
    reducing pressure on said liquid thereby allowing said gas dissolved in said liquid to be released in the form of microbubbles thereby removing contaminates attached to said microbubbles;
    circulating said gas with said contaminates to a condenser and condensing said contaminates and any of said liquid present in said gas in vapor form;
    recirculating said gas to said source of pressurized gas.

2. A method according to claim 1, wherein said liquid is water, said gas is air and said contaminates are organic contaminates.

3. A method according to claim 1, further comprising, after reducing pressure on said liquid, allowing said liquid to fall through a high velocity stream of gas supplied from said source of pressurized gas.

4. A system for removing contaminates from a liquid, comprising:
    a source of pressurized gas;
    means for dissolving and entraining a gas in said liquid under pressure such that said liquid becomes super-saturated with said gas;
    means for reducing pressure on said liquid thereby allowing said gas dissolved in said liquid to be released in the form of microbubbles thereby removing contaminates attached to said microbubbles;
    a condenser;
    means for circulating said gas with said contaminates to said condenser and condensing said contaminates and any of said liquid present in said gas in vapor form;
    means for recirculating said gas to said source of pressurized gas.

* * * * *